United States Patent Office 3,756,999
Patented Sept. 4, 1973

3,756,999
PROCESS FOR THE PREPARATION OF OXIDATION PRODUCTS OF ETHYLENE POLYMERS
Karl Stetter, Gersthofen, and Helmut Korbanka, Adelsried, Germany, assignors to Farbwerke Hoechst Aktiengesellschaft vormals Meister Lucius & Bruning, Frankfurt am Main, Germany
No Drawing. Filed July 14, 1971, Ser. No. 162,723
Claims priority, application Germany, July 18, 1970,
P 20 35 706.6
Int. Cl. C08f 27/22
U.S. Cl. 260—88.2 S
6 Claims

ABSTRACT OF THE DISCLOSURE

Oxidates of polyethylenes or copolymers of ethylene with α-olefins containing from 3 to 8 carbon atoms, are prepared by treating a dispersion of the molten polyolefin in water or a low fatty acid with oxygen or an oxygen-containing gas. The oxidates obtained are hard, soft or tough waxes and are used, according to their individual properties, for example, as modified plastics, polishing agents or coating material.

---

The present invention relates to a process for the preparation of oxidation products of ethylene polymers.

It has been known that polyethylenes can be converted into oxidation products by way of treating the polymer in the form of a powder, i.e. at a temperature below the melting point, optionally, in the presence of catalysts, with oxygen-containing gases (cf. German Offenlegungsschriften Nos. 1,495,887 and 1,495,938). However, this process has various disadvantages. Thus, for example, only an extremely slow oxidation is effected with the relatively low reaction temperature, which means that a reaction time is required which is hardly economical. This is why in practice products having an oxidation degree above the acid number of 40 are generally not prepared according to this process. The process also involves certain technical difficulties, as the polyolefin powder has to be subjected to oxidation at a temperature near its softening point, which makes it susceptible to agglutination and agglomeration. Besides, the process is limited to polyethylenes having a particularly high density, as polyethylenes having a lower density and thus a lower melting point do not permit the application of the temperatures which are actually necessary in order to obtain a sufficiently high reaction speed.

Another known oxidation process consists in oxidizing polyolefins in the melt with oxygen-containing gases, optionally, in the presence of catalysts. In this case, a higher oxidation speed is, in fact, generally reached, due to the opportunity to work at a higher reaction temperature, however, this process implies a low viscosity of the melt, which is generally the case only with polyolefin waxes having a low molecular weight. The oxidation of molten polyolefin waxes having a higher molecular weight and of plastic-like polyolefins cannot be carried out technically, owing to the high viscosity of the melt, or it leads to cross-linked products. The formation of the latter becomes evident, for example, by the fact that the viscosity of the oxidation melt reaches a high value, depending on the conditions either slowly or very suddenly, and in most cases already at a relatively low oxidation degree, and that the products finally even gelatinize, i.e. they become infusible, insoluble, and thus useless. In order to keep the formation of cross-linked proportions at a low level, it is necessary to provide a sufficient distribution of the oxidation gas in the polymer, for example, by maintaining a foam phase. Since an air distribution of this kind can only be effected, however, with substances having a low melt viscosity, the process for the oxidation of polyolefins in the melt is limited to low molecular weight, wax-like polymers having a molar weight of less than 10,000, in which case it is often necessary to keep the melt viscosity of the polyolefin at a low level, by means of admixing quality-reducing hydrocarbon waxes. Besides, in practice, only a relatively low oxidation degree up to an acid number of about 50 can be reached according to this process, owing to the growing tendency towards cross-linking, which develops while the oxidation is proceeding (cf. German Auslegeschrift No. 1,180,131, U.S. Pats. Nos. 2,952,649 and 3,160,621).

It has now been found that polyethylenes or copolymers of ethylene and α-olefins having from 3 to 8 carbon atoms can be oxidized with oxygen or oxygen-containing gases, optionally, in the presence of catalysts and/or wetting agents, to products having an acid number up to 200, if the polyolefins are oxidized in a molten state in the presence of a liquid dispersion agent which is inert towards oxygen, preferably in the presence of water, while steadily and intimately mixing the reaction components at a pressure in the range of from 0 to 100 atmospheres gage.

It was a surprising fact which could not have been foreseen that the polyethylenes and/or the ethylene copolymers and, in particlular, the high molecular weight types, could be oxidized better, and, if necessary, to a far higher degree, in the presence of a dispersion agent, than according to a melt or a fluidized bed process, since it was not to be expected that the oxidation reaction in the dispersion would proceed in a far different way than the known oxidation process in the melt. It was also surprising that even polymers of a very high molecular weight, which can practically not be oxidized according to the melt process, may be subjected to the above reaction, even with such an efficiency that in this case, too, products having acid numbers of 200 or more can be reached, without any disturbing cross-linking phenomena becoming evident.

By ethylene polymers according to the invention, there are to be understood homo- or copolymers of ethylene. The copolymers may contain, besides ethylene, other α-olefins having from 3 to 8 carbon atoms, for example, propylene, butene-1, pentene-1, hexene-1, heptene-1, 3-methyl-butene-1, 4-methyl-pentene-1, cyclopentene, cyclohexene, in an amount of up to 30% by weight. The polyolefins in question may have been prepared according to known processes, for example, by way of high, medium or low pressure polymerization. Polyolefins which have been obtained by a catalytic or thermal degradation from higher molecular weight polyolefins may also be oxidized in accordance with the invention.

The polyolefins used are in no way limited with regard to their structure and their molecular weight. For example, polyolefins having high or low branching degrees may be used. It is also possible to use for the oxidation low molecular weight, wax-like polyolefins having a molecular weight of between about 200 and 20,000, or plastic-like polyolefins having a molar weight of between about 20,000 and 2,000,000 or more. The mentioned polyolefins may also be subjected to oxidation in a mixture with one another, or in a mixture with natural or synthetic waxes and/or paraffins. Particularly suitable polymers are the commercial polyethylenes which often contain, besides ethylene, other α-olefins in a small proportion.

The oxidation process of the invention is generally effected in such a way that the polyolefin is distributed in the dispersion agent, optionally, in the presence of a catalyst and/or wetting agent, and that it is treated with the oxidation gas at a temperautre above the melting point of the polyolefin, with intimate and constant mixing of the reaction components.

As dispersion agents there are suitable those substances which are liquid under the reaction conditions, and which do not react chemically with the polyolefin or the oxidation gas. The most suitable dispersion agent is water. However, saturated aliphatic fatty acids having from 2 to 8 carbon atoms, optionally, in a mixture with water, may also be used as dispersion agents. If water is used as dispersion agent, the oxidation process of the invention can be effected already immedaitely after the preparation of the polyolefins, i.e. during or directly after the decomposition of the polymerization catalyst. In order to facilitate the dispersion of the polymer, wetting agents, for example, ethoxilation products of alcohols or phenols in an amount of from 0.01 to about 10% by weight, calculated on the polyolefin, may also be added to the reaction mixture.

The amount of the dispersion agent depends on the kind of polyolefin used. It is generally used in 1 to 100 times, preferably from 2 to 20 times the amount by weight, calculated on the polyolefin.

In order to reduce the induction time and to accelerate the oxidation process, the reaction according to the invention may be carried out in the presence of catalysts. As catalysts there may be used, for example, peroxy compounds, such as benzoyl peroxide, lauroyl peroxide, dicumyl peroxide, di-tert.-butyl peroxide, tert.-butyl-hydroperoxide, peracetic acid, moreover, azo compounds, for example, $\alpha,\alpha'$-azo-bis-isobutyronitrile. Besides, the compounds known from the paraffin oxidation may be used as catalysts, for example, heavy metal compounds, such as manganese or cobalt salts and/or complexes, alkali metal salts or alkaline earth salts, such as sodium acetate or sodium carbonate, or combinations of heavy metal compounds and alkali metal compounds and/or alkaline earth metal compounds, for example potassium permanganate. The catalysts are generally added to the reaction mixture in an amount of from 0.01 to 10% by weight, preferably from 0.05 to 5% by weight, calculated on the polyolefin. A catalytic effect can also be obtained by admixing a polyolefin that has already been oxidized to the polyolefin to be oxidized, or by using or adding a used dispersion agent. In order to reduce the oxidation time, it is possible to add ozone to the oxidation gas, or to carry out the reaction in the presence of high energy radiation, for example, ultra-violet light.

As oxidation gas use is generally made of air, besides, air-oxygen mixtures or pure oxygen or other gases containing oxygen may also be used. It is also possible to oxidize in the presence of oxygen carriers, for example nitrogen oxides.

The reaction temperature according to the invention shall be above the melting point of the polyolefin used; it shall be generally up to 100° C., preferably up to 30° C., above that point. In principle, higher temperatures may also be used, however, they often lead to products which are discolored and decomposed to a greater extent. As the melting temperature of the polymer used decreases with an increasing oxidation degree, the oxidation may also be effected in such a way that the reaction temperature is reduced to the same extent, in order to treat the product gently. The temperature control does not offer any difficulties in the process on the invention, as the dispersion agent used represents an ideal medium for the supply or elimination of heat.

Depending on the kind of polyolefin and dispersion agent used, the reaction may be carried out at atmospheric pressure or under an elevated pressure. If the boiling point of the dispersion agent is below the melting point of the respective polyolefin, at least such a pressure has to be maintained that the dispersion agent is present in the liquid state at the reaction temperature. Besides, it is in most cases advantageous to apply a more elevated pressure, as the higher oxygen concentration thus effected has a favorable influence on the reaction speed. The reaction is generally carried out at a pressure in the range of from atmospheric pressure to 100 atmospheres gage, preferably from about 3 to 50 atmospheres gage, in particular from 5 to 20 atmospheres gage.

The oxidation process can be stopped, after having reached any oxidation degree, by interrupting the supply of the oxidation gas, by adding anti-oxydants, for example, o-di-tert.-butyl-p-cresol or N-phenyl-2-naphthylamine, or by cooling below the reaction temperature. The dispersion agent is then generally separated from the liquid oxidation product. The molten oxidate may then be freed from undesired by-products, by stirring with fresh dispersion agent or with another washing liquid, for example, an alcohol. Volatile by-products can also be removed by drying the melt in vacuo. Another preferred mode of operation consists in cooling the reaction mixture after the oxidation, while stirring, or in spraying the reaction mixture under pressure, or in releasing it into another vessel. In both cases the oxidation product solidifies in a fine-grained form, so that it can easily be separated from the dispersion agent and dried, optionally, after having been washed.

The properties of the polyolefin oxidates prepared in accordance with the invention are determined by the oxidation degree reached, the kind of the polyolefin used, its molecular weight, and by the reaction conditions applied. If all these possibilities are taken into consideration, it is possible to manufacture products, the properties of which meet the various requirements of practice.

The oxidation is in any case connected with a more or less strong degradation of the polymer chain, the degree of degradation increasing with the degree of oxidation. Accordingly, products having been oxidized only to a small extent still show largely the properties of the polyolefin used, which properties have only been modified by the oxidation. As the oxidation is proceeding, the characteristics of the polyolefin used are lost more and more, and products having new properties are formed.

For example, if high molecular weight, plastic-like ethylene polymers or copolymers having a molecular weight of from about 20,000 to 2,000,000 or more or having a melting index of between 1,000 and 0.01 or below are oxidized to products having an acid number of no more than 10, products are obtained which show increased flow properties and thus a facilitated workability, as compared against the starting products. They show an improved compatibility with additives, such as filling material, processing auxiliaries, etc., an improved adhesive strength, dyeing capacity and printing capacity.

If the above-mentioned plastic-like polyolefins are oxidized to a higher degree, for example, to products having an acid number of up to 200 or more, the intensified degradation of the polymer chain involved leads to products which show an increasing wax-like character. Although the degradation degree is generally largely determined by the oxidation degree, it is nevertheless possible to influence it by the kind of polyolefin used and by the reaction conditions applied. For example, pure polyethylenes are degraded more slowly than copolymers of ethylene. The degradation can also be kept at a low level by mild reaction conditions, for example, by maintaining low reaction temperatures. By considering these possibilities, oxidation products can be prepared, the properties of which are adapted to the various application purposes, for example, hard, soft, or tough waxes.

The wax-like oxidates, are distinguished from the oxidates still having a prevailing plastic character, among other things, by their low melt viscosities which are generally between 10 and 50,000 centipoise (140° C.). The molecular weights of these products are generally in the range of from 200 to 20,000, their melting points are in the range of from 70 to 130° C. It goes without saying that all possible intermediates products can be obtained between the oxidation products having a prevailing plastic-like character and the oxidates having a prevailing wax-like character. It is also possible to carry out the oxidation and degradation to such a degree that products having a fat character, i.e. technical fatty acids and/or fatty acid mixtures, are obtained.

A particular advantage of the oxidation process according to the invention becomes evident by the fact that it is in no way limited with regard to the molecular weght of the polyolefins used, as has been stated above. Thus, it is possible to use, besides the plastic-like polyolefins mentioned above, also those having a low molecular weight, for example, in the range of from 200 to 20,000. Wax-like polyolefins having a molecular weight of from 200 to 10,000 which have been used for the melt oxidation process common up to now, also belong to this category. The low molecular weight polyolefins in question can have been prepared by polymerization as well as by a catalytic or thermal degradation of higher molecular weight polyolefins. The oxidation of the low molecular weight polyolefins also results in wax-like products, the character of which is generally similar to that of the products obtained according to the common melt oxidation. However, as the oxidation process of the invention is effected faster and more gently as compared against the common melt oxidation, the products obtained show an improved colour, a greater hardness, and a lower melt viscosity, in comparison with the products obtained by way of the melt oxidation common so far. Besides, as there is hardly any risk of a cross-linking of the polymer in the process according to the invention, the wax-like, low molecular weight polyolefins, too, may be oxidized to products having an acid number of up to 200 or more.

The wide range of application of the process of the invention, which is independent of the molecular weight for special fields of application. Oxidates of this kind show improved flow properties in the molten state and thus a facilitated workability; they are suitable, for example, for the manufacture of thin-walled articles, such as sheets or bottles. They are also suitable for the manufacture of firmly adhering coatings on various surfaces. It goes without saying that the properties of the oxidates can be modified. For example, their hardness can be improved by adding metal hydroxides.

The wax-like oxidates are suitable for numerous fields of application. They can be converted into aqueous emulsions, for example, according to known methods, optionally, while applying pressure. Such emulsions can be used, for example, for bright-drying polishes, for the finish of textiles, for paper coating, or in the building material industry. Besides, they can be used in the preparation of floor polishes, candles, and cosmetics, or as an auxiliary in the processing of plastic materials. These oxidates, too, can be modified in various ways, for example, by a subsequent treatment with oxidation agents, such as nitric acid, chromic acid, or hydrogen peroxide, or by way of conversion into esterification and saponification products. They can also be used advantageously in combination with other waxes, for example, ester waxes. The oxidates having a fat character may be used in every case where technical fatty acids are used, for example, after conversion into derivatives, such as esters, amides, salts, halogenation products, etc., for example, in the fields of lubricants, detergents, textile auxiliaries, and plant protection agents.

The following examples illustrate the process of the invention. The process products are characterized by determining their physical and utilitarian properties in accordance with the following method:

| Property | Measuring method |
| --- | --- |
| Density | DIN 53 479. |
| Melt index MFI 190/5 | DIN 53 735 E. |
| Reduced specific viscosity | Viscosity measurement of a solution of 0.25 g. of a sample substance in 100 ml. of decahydronaphthalene at 130° C. |
| Melt viscosity | Measurement at 140° C. in centipoise (c.p.). |
| Crystallite melting point (final point) | Polarizing microscope. |
| Acid number | DGF M IV 2 (57). |
| Saponification number | DGF M IV 2 (57). |
| Flow point/drop point | DGF M III 3 (57). |
| Hardness: | |
| (1) Penetrometer number (PN) according to Richardson | ASTM D 1321–57/DIN 1995. |
| (2) Stamp hardness | The test substance is loaded by a stamp having a section of 1 cm.² at 20° C. with slowly increasing pressure. By the hardness of the test specimen there is to be understood the pressure, at which the stamp penetrates into the test substance. | of the polyolefin used, has also economical advantages, as polyolefins available at low expense may be used. It is possible, for example, to prepare, by a single operation, wax-like oxidates from commercial plastic-like polyethylenes, whereas in the common oxidation in the melt the polyethylene generally has first to be degraded thermally to become a wax, in order to be oxidized. The short reaction time, too, has a favorable influence on the economy of the process. Another advantage of the process is marked by the fact that it leads to oxidates having improved properties and an extended scope of application. Owing to the fast oxidation and the mild reaction conditions, the products show an improved colour and hardness, as well as a reduced tendency towards cross-linking. The variety of the starting products suitable for the reaction and the opportunity to arrive at a higher oxidation degree than with the known oxidation process make it possible to adapt the properties to a higher extent to the requirements of the practice.

The oxidation products of polyolefins prepared in accordance with the invention show excellent properties of use and can be utilized in many fields of application. The products obtained by the oxidation of high molecular weight polyolefins to a low acid number represent plastics having modified properties, as they are desired

EXAMPLES 1 TO 10

A wax obtained by thermal degradation of polyethylene served as starting material, the wax having a molecular weight of 9,000, a reduced specific viscosity of 0.50 dl./g., a density of 0.96 g./cm.³ and a flow point/drop point of 126/127° C. In all the examples, the same reaction temperature and the same reaction pressure were maintained, the weight ratio of wax to water, the catalyst, and the reaction time were varied, as has been indicated in Table 1.

For the oxidation, 500 grams each of the pulverized wax were mixed with water and the catalyst in an enamel pressure vessel provided with stirrer and pressure cooler. After the reaction mixture had been heated to 130° C., an air current of 100 liters per hour was conducted through the mixture, while stirring vigorously, and while maintaining a pressure of 10 atmospheres gage. After the reaction time had run out, the stirrer was turned off, and the water was separated from the supernatant oxidation product. Subsequently the oxidate still in a liquid state was washed with water the closed vessel at 130° C., and was finally dried in vacuo. The properties of the oxidation products obtained are shown in Table 1.

TABLE 1

| Example No. | Weight ratio polyolefin: water | Catalyst (percent by weight, calculated on the polyolefin) | Reaction time (hrs.) | Acid number | Saponification number | Flow point/ drop point (° C.) | Reduced specific viscosity (dl./g.) | Melt viscosity (cp.) | Stamp hardness (kg./cm.²) |
|---|---|---|---|---|---|---|---|---|---|
| 1 | 1:6 | None | 12 | 12 | | | | | |
| 2 | 1:6 | ...do... | 16 | 39 | 58 | 118/119 | | | |
| 3 [a] | 1:6 | ...do... | 24 | 97 | | | | | |
| 4 | 1:4 | 0.5 of t.-butyl-hydroperoxide | 13 | 23 | | | | | |
| 5 | 1:4 | ...do... | 19 | 40 | 67 | 118/119 | 0.14 | 200 | 640–700 |
| 6 | 1:4 | ...do... | 20 | 52 | 83 | 115.5/116 | 0.08 | 92 | 620–680 |
| 7 | 1:4 | ...do... | 22 | 85 | 132 | 110.5/111 | | | |
| 8 | 1:4 | ...do... | 27 | 121 | 173 | 106/106.5 | 0.03 | 33 | 400–500 |
| 9 [b] | 1:4 | ...do... | 22 | 10 | | | | | |
| 10 | 1:2 | ...do... | 22 | 17 | 38 | 119/120 | | | |

[a] For the oxidation, 0.5 g. of ethoxilized p-nonyl phenol was added as wetting agent.
[b] Reaction pressure: 5 atmospheres gage.

EXAMPLE 11

500 grams of a wax obtained by thermal degradation of polyethylene and having a molecular weight of 3,000, a reduced specific viscosity of 0.14 dl./g., a density of 0.95 g./cm.³ and a flow point/drop point of 115/116° C., were oxidized with air, as has been shown in Examples 1 to 10. The weight ratio of the polyolefin wax to water was 1:4, as catalyst there was used 1 gram of di-t.-butyl peroxide. After a reaction time of 12 hours, the colourless oxidation product showed an acid number of 19, a saponification number of 29, a flow point/drop point of 113.5/114° C. and a penetrometer number of less than 1. After a reaction time of 18 hours, the oxidation product had an acid number of 86, a saponification number of 129, a flow point/drop point of 107.5/108° C., and a penetrometer number of 3.

EXAMPLE 12

150 grams of a wax obtained by thermal degradation of polyethylene and having a molecular weight of 9,000, a reduced specific viscosity of 0.50 dl./g., a density of 0.96 g./cm.³ and a flow point/drop point of 126/127° C. were heated to a temperature of 130° C. in a glass vessel having a capacity of 2 liters and having been provided with a reflux cooler, in the presence of 1 liter of propionic acid. 30 liters of air per hour were conducted for 24 hours through the mixture, while stirring vigorously. Subsequently the oxidation product was separated from the dispersion agent, after having been cooled to a temperature below the melting point, then it was washed by way of stirring with water in a closed vessel at a temperature of 125° C., and finally it was dried in vacuo at 130° C. The oxidation product had an acid number of 42, a saponification number of 87 and a flow point/drop point of 115/115.5° C.

EXAMPLE 13

The same polyethylene degradation wax as the one mentioned in Example 12 above was oxidized in like manner, in which process, however, 1% by weight of ozone was added as catalyst to the oxidation gas. After a reaction time of 24 hours, the oxidation product had an acid number of 94, a saponification number of 168 and a flow point/drop point of 109/110° C.

EXAMPLE 14

Example 12 was repeated, while using pure oxygen as oxidation agent instead of air. After a reaction time of 24 hours, an oxidation product was obtained which had an acid number of 82, a saponification number of 148 and a flow point/drop point of 110/111° C.

EXAMPLES 15 TO 26

As starting product there was used a copolymer consisting of 97% of ethylene and 3% of propylene having a density of 0.95 g./cm.³, a melt index of 25 g./10 min., a reduced specific viscosity of 1.41 dl./g., and a crystallite melting point of 130° C. In all the examples, the same reaction pressure of 10 atmospheres gage was maintained, whereas the other reaction conditions were varied, as has been indicated in Table 2. The oxidation was effected in such a way that 500 grams each of the pulverized copolymer were mixed with water and the catalyst in an enamel pressure vessel and were subsequently blown with 100 liters of air per hour, while stirring vigorously, at the reaction temperature chosen, and while maintaining a pressure of 10 atmospheres gage. After the reaction time had run out, the content of the vessel was released into a cold vessel. The oxidation product was obtained in a fine-grained form. The oxidate was filtered from water by suction, was washed with fresh water and dried. The properties of the products obtained are shown in Table 2.

TABLE 2

| Example No. | Weight ratio polyolefin: water | Catalyst (percent by weight, calculated on the polyolefin) | Reaction temperature (° C.) | Reaction time (hrs.) | Acid number | Saponification number | Flow point/ drop point (° C.) | Reduced specific viscosity (dl./g.) | Melt viscosity (cp.) | Hardness PN | Stamp hardness (kg./cm.²) |
|---|---|---|---|---|---|---|---|---|---|---|---|
| 15 | 1:3 | 0.5 of benzoyl-peroxide | 145 | 14 | 22 | 45 | 117.5/118 | 0.23 | 1,990 | <1 | 770–800 |
| 16 | 1:3 | ...do... | 145 | 19 | 29 | 57 | 115/116 | | | | |
| 17 | 1:4 | 0.5 of t.-butyl-hydroperoxide. | 145 | 1.5 | 4 | 10 | | 0.62 | | | |
| 18 | 1:4 | ...do... | 145 | 12 | 45 | 75 | 114.5/115 | | 317 | 1 | 660–720 |
| 19 | 1:4 | ...do... | 145 | 13.5 | 61 | 102 | 111/111.5 | 0.09 | 155 | 1 | 650–670 |
| 20 | 1:4 | ...do... | 145 | 20 | 90 | 144 | 106.5/107 | 0.06 | 56 | 2 | 530–560 |
| 21 | 1:4 | | 140 | 15 | 58 | 90 | 114/115 | | | | |
| 22 | 1:4 | 0.5 of cobalt stearate | 140 | 15 | 64 | 98 | 111/112 | | | | |
| 23 | 1:4 | 0.5 of cobalt stearate plus 0.2 of sodium stearate. | 140 | 15 | 89 | 129 | 105/106 | | | | |
| 24 | 1:4 | 0.2 of KMnO₄ | 140 | 15 | 123 | 195 | 101/102 | 0.02 | 71 | 6 | 250–290 |
| 25 [a] | 1:4 | | 140 | 15 | 26 | 47 | 117.5/118 | | | | |
| 26 [a,b] | 1:4 | | 140 | 15 | 38 | 55 | 115/116 | | | | |

[a] Oxidation with 20 liters of air per hour.
[b] 0.5 g. of ethoxilized p-nonyl phenol was added as wetting agent for the oxidation.

EXAMPLES 27 to 29

400 grams each of a copolymer consisting of 98.5% of ethylene and 1.5% of propylene having a density of 0.95 g./cm.$^3$, a melt index of 29 g./10 min., a reduced specific viscosity of 1.35 dl./g. and a crystallite melting point of 129° C. were mixed with 2.4 liters of water and 1 gram of t.-butyl-hydro-peroxide in an autoclave having a capacity of 5 liters and made from stainless steel. At a temperature of 135° C., an air current of 40 liters per hour was conducted through the mixture, while stirring, a pressure of 10 or 20 or 50 atmospheres gage being maintained. After a reaction time of 9 hours, the mixture was cooled to room temperature, the precipitated oxidation product was separated and was dried in a molten state, at a temperature of 130° C. in vacuo. The properties of the products obtained are shown in Table 3.

TABLE 3

| Example No. | Reaction pressure (atm. gage) | Acid number | Saponification number | Flow point/drop point (° C.) |
|---|---|---|---|---|
| 27 | 10 | 42 | 76 | 114.5/115 |
| 28 | 20 | 50 | 92 | 114/115 |
| 29 | 50 | 73 | 112 | 111/112 |

EXAMPLES 30 to 35

As starting product there was used a copolymer consisting of 99% of ethylene and 1% of α-butylene, which copolymer had a density of 0.95 g./cm.$^3$, a melt index of 1.5 g./10 min., a reduced specific viscosity of 3.29 dl./g., and a crystallite melting point of 130° C. In all the examples the same reaction pressure was maintained, whereas the other conditions were varied, as has been indicated in Table 4. For the oxidation, 500 grams each of the copolymer were mixed with 2 liters of water and 2 grams of tert.-butyl-hydro-peroxide in an enamel pressure vessel. At the reaction temperature chosen, 100 liters of air per hour were introduced into the mixture, while stirring vigorously, a pressure of 10 atmospheres gage being maintained by way of regulation of the amount of exhaust gas. After the reaction time had run out, the mixture was cooled, while stirring, the precipitated oxidation product was filtered off, was washed with water and dried. The properties of the oxidates obtained are shown in Table 4.

TABLE 4

| Example No. | Reaction temperature (° C.) | Reaction time (hrs.) | Acid number | Saponification number | Flow point/drop point (° C.) | Reduced specific viscosity (dl./g.) | Melt viscosity (cp.) | Hardness PN | Stamp hardness (kg./cm.$^2$) |
|---|---|---|---|---|---|---|---|---|---|
| 30 | 135 | 18 | 35 | 67 | 117.5/118 | 0.15 | 780 | 1 | 700–750 |
| 31 | 140 | 18 | 45 | 79 | 114.5/115 | 0.12 | 480 |  | 660–700 |
| 32 | 140 | 20 | 62 | 103 | 113/113.5 | 0.11 | 146 |  | 630–670 |
| 33 | 140 | 22 | 81 | 139 | 108/109 | 0.08 | 100 |  |  |
| 34 | 140 | 23 | 88 | 154 | 108/108.5 | 0.075 | 58 | 2 | 550–590 |
| 35 a | 135 | 22 | 117 | 176 | 106/107 | 0.07 | 35 | 3 | 440–460 | a Only 250 g. of polyethylene were used.

EXAMPLE 36

500 grams of a low pressure polyethylene having a density of 0.95 g./cm.$^3$, a melt index of 110 g./10 min., a reduced specific viscosity of 0.68 dl./g. and a crystallite melting point of 128° C. were oxidized with air at a temperature of 130° C., as has been described in Examples 29 to 35. After a reaction time of 10 hours, the colourless oxidation product had an acid number of 22, a saponification number of 38, a flow point/drop point of 120.5/121° C., and a reduced specific viscosity of 0.21 dl./g.

EXAMPLE 37

200 grams of a high pressure polyethylene having a density of 0.918 g./cm.$^3$, a melt index of 80 g./10 min., a reduced specific viscosity of 0.70 dl./g., and a crystallite melting point of 108° C. were oxidized for 10 hours with an air current of 30 liters per hour in an autoclave having a capacity of 5 liters and made from stainless steel, together with 2 liters of water and 0.5 gram of t.-butyl-hydro-peroxide, at a temperature of 120° C. and a pressure of 50 atmospheres gage, while stirring. The oxidation product had an acid number of 22, a saponification number of 36, a flow point/drop point of 106.5/107° C., a reduced specific viscosity of 0.14 dl./g., a melt viscosity of 121 cp., and a penetrometer number of 2.

EXAMPLES 38 to 41

As starting product there was used a commercial low pressure polyethylene having a density of 0.97 g./cm.$^3$, a melt index of 17 g./10 min., a reduced specific viscosity of 1.46 dl./g., and a crystallite melting point of 135° C. In all the examples a reaction pressure of 10 atmospheres gage was maintained, the other conditions were varied, as has been shown in Table 5. For the oxidation, 500 grams each of the polyethylene were mixed with 2 liters of water and 1 gram of benzoyl peroxide in an enamel pressure vessel. At the reaction temperature chosen, 100 liters of air per hour were blown through the mixture, while maintaining the pressure and stirring vigorously. After the reaction time had run out, the contents of the vessel were cooled to room temperature, while stirring. The oxidation product precipitated in a granular form was filtered from the water by suction, was then washed with fresh water and dried in a drying cabinet. The properties of the products obtained can be seen from Table 5.

TABLE 5

| Example No. | Reaction temperature (° C.) | Reaction time (hrs.) | Acid number | Saponification number | Flow point/drop point (° C.) | Reduced specific viscosity (dl./g.) | Melt viscosity (cp.) | Stamp hardness (kg./cm.$^2$) |
|---|---|---|---|---|---|---|---|---|
| 38 | 145 | 2 | 4 |  |  | 0.57 |  | >900 |
| 39 | 140 | 16 | 32 | 60 | 119/119.5 | 0.21 | 611 | 760–850 |
| 40 | 140 | 21 | 79 | 126 | 112.5/113 | 0.04 | 58 | 640–730 |
| 41 | 145 | 19 | 119 | 181 | 98.5/99 | 0.03 | 41 | 340–360 |

EXAMPLES 42 to 49

As starting material there was used a commercial polyethylene powder having a density of 0.96 g./cm.$^3$, a melt index of 0.3 g./10 min., a reduced specific viscosity of 3.43 dl./g., and a crystallite melting point of 131° C. The reaction conditions were varied for the individual examples, as has been indicated in Table 6. For the oxidation, the polyethylene was mixed each time with 2 liters of water and the catalyst in an autoclave having a capacity of 5 liters. Under the reaction conditions chosen, 40 liters of air per hour were introduced into the mixture, while stirring. After the reaction time had run out, the stirrer and heating were turned off. The oxidation product which had precipitated after cooling was separated from the water, was then ground in the presence of fresh water, filtered off and dried. The properties of the oxidates obtained are indicated in Table 6.

tion is carried out in the presence of from 0.01 to 10% by weight, calculated on the polyolefin, of an ethoxilized alcohol or an ethoxilized phenol as wetting agent.

TABLE 6

| Example No. | Weight ratio polyolefin:water | Catalyst (percent by weight, calculated on the polyolefin) | Reaction pressure (atm. gage) | Reaction temperature (° C.) | Reaction time (hrs.) | Acid number | Saponification number | Flow point/drop point (° C.) | Reduced specific viscosity (dl./g.) | Melt viscosity (cp.) | Stamp hardness (kg./cm.²) |
|---|---|---|---|---|---|---|---|---|---|---|---|
| 42 | 1:5 | | 50 | 140 | 12 | 94 | 132 | 106/106.5 | | | |
| 43 | 1:5 | 0.5 of t.-butyl-hydroperoxide | 50 | 140 | 12 | 103 | 146 | 110.5/111 | | | |
| 44 | 1:6 | do | 10 | 135 | 10 | 34 | 55 | 122.5/123 | 0.20 | 411 | 740-760 |
| 45 | 1:6 | do | 50 | 135 | 15 | 141 | 198 | 103/103.5 | | | |
| 46 | 1:10 | do | 50 | 140 | 10 | 102 | 138 | 110.5/111 | | | |
| 47 | 1:10 | | 50 | 140 | 10 | 60 | 98 | 117.5/118 | 0.10 | 74 | 630-680 |
| 48 | 1:10 | | 50 | 160 | 10 | 76 | 112 | 98/99 | | | |
| 49 | 1:10 | 0.25 of sodium stearate | 50 | 140 | 10 | 80 | 118 | 117/118 | | | |

EXAMPLES 50 to 55

200 grams of polyethylene having a density of 0.95 g./cm.³, a melt index of less than 0.01 g./10 min., a reduced specific viscosity of 15 dl./g., and a crystallite melting point of 137° C. were oxidized with air, as has been indicated in Examples 42 to 49. The reaction conditions maintained for the individual experiments, as well as the data of the oxidates obtained have been indicated in Table 7.

4. A process as claimed in claim 1, wherein the oxidation is carried out in the presence of both a radical-yielding compound, a heavy metal salt, heavy metal salt complex, an alkali metal salt or an alkaline earth metal salt as catalyst and an ethoxilized alcohol or phenol as wetting agent, each additive being used in an amount of from 0.01 to 10% by weight, calculated on the polyolefin.

5. A process as claimed in claim 1, wherein the weight ratio of the olefin polymer to the dispersion agent is in the range of from 1:1 to 1:100.

TABLE 7

| Ex. No. | Catalyst (percent by weight, calculated on the polyolefin) | Reaction pressure (atm. gage) | Reaction temperature (° C.) | Reaction time (hrs.) | Acid number | Saponification number | Flow point/drop point (° C.) | Reduced specific viscosity (dl./g.) | Melt viscosity (cp.) | Hardness PN | Stamp hardness (kg./cm.²) |
|---|---|---|---|---|---|---|---|---|---|---|---|
| 50 | 0.5 of t.-butyl-hydroperoxide | 100 | 150 | 6 | 152 | 223 | 100/101 | | | | |
| 51 | do | 50 | 150 | 6 | 51 | 94 | 115/115.5 | | | | |
| 52 | 0.5 of benzoyl-peroxide plus 0.5 M of sodium stearate | 50 | 140 | 8 | 76 | 110 | 115/115.5 | | | | |
| 53 | 1 of sodium stearate | 50 | 140 | 10 | 108 | 165 | 111/112 | 0.029 | 31 | 1 | 600-670 |
| 54 ᵃ | 0.5 of t.-butyl-hydroperoxide | 50 | ᵇ 150-135 | 6 | 124 | 178 | 111/112 | 0.026 | 26 | 2 | 400-440 |
| 55 | do | 100 | 150 | 10 | 185 | 266 | 89.5/90 | | | | |

ᵃ For the oxidation, 0.5 g. of ethoxilized fatty alcohol of tallow was added as wetting agent.
ᵇ In the course of the reaction, the temperature was reduced from 150° C. to 135° C.

What is claimed is:

1. A process for the oxidation of polyethylene or copolymers of ethylene with α-olefins containing from 3 to 8 carbon atoms, which polymers have a molecular weight of from 200 to 2,000,000 by treating the polymers with oxygen or oxygen-containing gases, which process comprises dispersing the homopolymers or copolymers of ethylene in water, and subsequently treating the dispersion obtained, at a pressure of from 0 to 100 atmospheres gauge and a temperature in the range between the melting point of the respective polymer and 100° C. above that point, with oxygen or an oxygen-containing gas, while constantly and intimately mixing the components.

2. A process as claimed in claim 1, wherein the oxidation is carried out in the presence of from 0.01 to 10% by weight, calculated on the polyolefin, of a radical-yielding compound, a heavy metal salt, a heavy metal salt complex, an alkali metal salt, or an alkaline earth metal salt as catalyst.

3. A process as claimed in claim 1, wherein the oxidation

6. A process as claimed in claim 1, wherein air is used as oxygen-containing gas.

References Cited

UNITED STATES PATENTS 3,278,513  10/1966  Johnstorfer et al. _____ 260—94.9 G C
3,463,767  8/1969   Bush et al. _____ 260—94.9 G C
3,374,073  3/1968   Gergel _____ 260—94.9 G C

FOREIGN PATENTS 968,960  9/1964  Great Britain.

JOSEPH L. SCHOFER, Primary Examiner
E. J. SMITH, Assistant Examiner

U.S. Cl. X.R.
260—94.9 G C